United States Patent [19]

Boden et al.

[11] 3,726,952
[45] Apr. 10, 1973

[54] METHOD OF MOLDING INTERGRAL SKIN POLYURETHANE FOAMS HAVING MOLD RELEASE PROPERTIES

[75] Inventors: Heinrich Boden, Opladen; Wulf Von Bonin, Helmut Kleimann, Harald Mergard, all of Leverkusen, Leverkusen, Germany

[73] Assignee: Bayer Aktiengesellschaft, Leverkusen, Germany

[22] Filed: Oct. 21, 1970

[21] Appl. No.: 82,793

[30] Foreign Application Priority Data

Oct. 24, 1969   Germany.....................P 19 53 637.9

[52] U.S. Cl...........264/48, 260/2.5 AC, 260/2.5 AZ, 260/18 TN, 264/53, 264/54, 264/338, 264/DIG. 14
[51] Int. Cl. ....B29d 27/04, G08g 22/36, C08g 22/44
[58] Field of Search....................260/2.5 AZ, 2.5 AC; 264/DIG. 14, 48, 54, 53, 338

[56] References Cited

UNITED STATES PATENTS

| | | | |
|---|---|---|---|
| 3,586,649 | 6/1971 | Cobbledick | 260/18 TN X |
| 2,921,915 | 1/1960 | Brochhagen et al | 260/2.5 AC UX |
| 2,932,621 | 4/1960 | Terry | 260/2.5 AC |
| 3,437,608 | 4/1969 | Pohl | 260/2.5 AC UX |
| 3,222,303 | 12/1965 | Hampson | 260/2.5 AC |

FOREIGN PATENTS OR APPLICATIONS

| | | | |
|---|---|---|---|
| 214,810 | 5/1958 | Australia | 260/2.5 AC |
| 879,167 | 3/1958 | Great Britain | 260/2.5 AC |
| 967,443 | 8/1964 | Great Britain | 260/2.5 AC |
| 852,138 | 10/1960 | Great Britain | 260/2.5 AC |
| 587,370 | 11/1959 | Canada | 260/2.5 AZ |
| 651,638 | 11/1962 | Canada | 260/2.5 AC |
| 794,051 | 4/1958 | Great Britain | 260/2.5 AC |
| 1,160,042 | 7/1969 | Great Britain | 260/2.5 AZ |
| 1,367,045 | 7/1962 | France | 260/2.5 AC |
| 732,648 | 4/1966 | Canada | 260/2.5 AC |

OTHER PUBLICATIONS

Wirtz, Hans "Integral Skin Urethane Foam Molding" in Journal of Cellular Plastics, Sept./Oct., 1969, pp. 304–309.

*Primary Examiner*—Philip E. Anderson
*Attorney*—Edward J. Whitfield

[57] ABSTRACT

A process is disclosed which eliminates the necessity of applying a mold release agent to the mold when producing integral skinned polyurethane foam moldings in closed molds. This is accomplished by incorporating in the foamable reaction mixture an additive, which imparts mold release properties, said additive containing at least 25 aliphatic carbon atoms and being the salt of an aliphatic carboxylic acid and either a primary amine or an amine which contains either amide or ester groups.

7 Claims, No Drawings

METHOD OF MOLDING INTERGRAL SKIN POLYURETHANE FOAMS HAVING MOLD RELEASE PROPERTIES

This invention relates to the production of integral skin polyurethane foams and more particularly to the use of an additive in the foam formulation which precludes the necessity of applying a release agent to the mold.

Polyurethane foams having an impervious outer skin and a cellular core, of the kind obtained by the mold-foaming method described, for example in German Auslegeschrift 1,196,864 and in co-assigned U. S. Pat. No. 712,111 filed Mar. 11, 1968 and now abandoned are eminently suitable for the mass production of lightweight structures, such as, for example, in furniture making, motor vehicle manufacture and house building.

The polyurethane moldings are produced by introducing a foamable reaction mixture comprising a polyisocyanate, a compound containing at least 2 hydrogen atoms reactive with isocyanates and additives, into a closed heatable mold, in which the foam expands and solidifies under high compression. The plastics material fills the mold exactly and reproduces the inner surfaces thereof.

It is preferred to use molds made of a material of extremely high thermal capacity and equally high thermal conductivity, preferably a metal. It is also possible, however, to use molds made of other materials, such as, for example, plastics, glass or wood.

In order to prevent the foamed molding from adhering to the surface of the mold during mold-release, the mold is conventionally provided with a release agent. Waxes, soaps and oils are commonly used as mold release agents. These mold release agents form a thin film between the surface of the mold and the foamed molding which does not adhere either to the mold or to the molding, and thus enables the molding to be readily removed from the mold.

Unfortunately, this method possesses several disadvantages in so far as mass production is concerned. The release agent has to be applied at regular intervals and during this period, the mold cannot be used. In addition, any engraving in the surface of the mold, for example an imitation wood grain, becomes covered with residues of release agent over a period of time. These firmly adhering residues are expensive to remove from the frequently complex contoured molds. Moreover, the finished moldings are covered with a thin film of release agent, to which lacquer systems do not readily adhere. Accordingly, the moldings have to be ground before lacquering, or treated with solvents, to guarantee adequate adhesion of the lacquers to the molding.

It is therefore an object of this invention to provide a method of producing foamed moldings free of the disadvantages of prior art methods. It is another object of this invention to provide a method of producing foamed moldings which dispenses with the necessity of applying a mold release agent to the mold. It is a further object of this invention to provide a foamable mixture which has outstanding mold release properties.

The foregoing objects and others which will become apparent from the following description are accomplished in accordance with the invention, generally speaking, by adding to the foamable reaction mixture salts of aliphatic carboxylic acids and primary amines or amines containing amide or ester groups containing a total of at least 25 aliphatic carbon atoms distributed between the amine and the carboxylic acid.

Since these salts internally lubricate the plastics mixture, they simultaneously impart to the foamable reaction mixture outstanding flow properties in the mold coupled with reduced bubble formation in the surface of the finished molding. In addition, these additives have an antistatic effect.

A measure of the release effect is the force per $cm^2$ which is required to open the molds during mold release. The mold release forces which have to be applied with the plastics containing the additives according to the invention are lower than those which have to be applied with similar plastics when a release agent has been applied to the mold.

It is pointed out that the process of foaming in closed molds yields a foam which has a much greater density than that obtained when foaming is carried out in open molds, and whose characteristics feature is a firm non-cellular non-porous outer skin which is considerably thicker than the cell walls inside the foam. Accordingly, this outer skin, which is the characteristic of the polyurethane foam obtained according to the invention, and which largely determines its surface properties, is not a foam, which is particularly noticeable in the case of standard wall thicknesses of up to several millimeters. Accordingly, a foam of this kind cannot be directly compared with the hitherto conventional foams, produced in open molds, which normally do not have a coherent outer skin or whose outer skin is comparable in its wall thickness with the cell wall thicknesses inside the foam. To this extent, it is not possible to derive any measures in regard to the mold release properties of polyurethane foams obtained by the process described above, from the formulations for conventional foams foamed in open molds because it is actually in the vicinity of the mold walls that the material does not have the character of the foam.

Although in conventional foam recipes, fatty acids, sulphonic acids, tertiary fatty amines or other surfactants, have hitherto been used as activators or as lubricants or extenders for delaying or promoting foam formation and as emulsifiers, there have not yet been any reports relating to the mold release properties of these materials in a foam characterized by a relatively thick homogeneous top layer of a non-foam material, nor are they seen to have any effect when the foams according to the invention are produced, or alternatively, any effect that they may have is offset by other disadvantages.

Thus, the presence of sulphonic acid in the covering layer of these foams leads to reduced weather resistance, while foam formation can be adversely affected, i.e., delayed. Because they obviously cannot be incorporated in the polyurethane structure, tertiary amines tend to exude, and thus adversely affect the lacquering properties of the covering layers. Products with pronounced surfactant properties are also unsuitable, because they promote degradation of the surface through hydrolytic influences.

According to the invention, these disadvantages are obviated by selecting a special combination of the additives used as release agents, by employing salts of aliphatic carboxylic acids with primary amines or with amines containing amide groups or ester groups. To obtain a satisfactory release effect these salts must contain a total of at least 25 aliphatic carbon atoms distributed between amine and acid.

This means that the amine can be a relatively short-chain amine when the carboxylic acid has a long chain; or the carboxylic acid can have a relatively short chain when the amine has a long chain. It is preferred, however, that both the amine, whether a primary amine or an amine containing amide or ester groups, and the carboxylic acid should contain more than 12 aliphatic carbon atoms.

To explain the fact that it is only by using the amines referred to above, that useful results are obtained without any adverse effects on, for example, the lacquering properties of the surface, it can be assumed that primary amines react with excess isocyanates to form ureas which, like the amines containing amide groups or ester groups (which do not have to have a primary character), are retained in the foam through proton bridges or even through secondary reactions, and as a result do not exude. Although it is also possible in principle to use secondary amines free from amide or ester groups, this does not provide such good properties in regard to mold release and affinity for lacquers.

Accordingly, the present invention relates to a process for the production of foams which comprises foaming a reaction mixture of a polyisocyanate, a compound containing reactive hydrogen atoms, water or an organic expanding agent and an additive in a closed mold, wherein the additive is a salt, containing at least 25 aliphatic carbon atoms, of an aliphatic carboxylic acid and a primary amine or an amine containing amide or ester groups.

In a preferred embodiment, the additive is a salt of a fatty acid containing at least 12 aliphatic carbon atoms.

In a particularly preferred embodiment, the additive is a salt of a fatty acid containing at least 12 aliphatic carbon atoms, and a primary amine containing at least 12 aliphatic carbon atoms or an amine containing amide or ester groups and having at least 12 aliphatic carbon atoms.

It is surprising that such salts are effective, since they contain groups which are able to react with isocyanates as a result of which: they should be deprived of any effect. In addition, there is no deterioration in the quality of the foam although the additives, when they are monofunctional, should have resulted in chain breakages. In addition, the affinity for lacquers of the moldings produced with the additives according to the invention is surprisingly not reduced. The additives used according to the invention are employed in quantities of from about 0.1 percent to about 15 percent by weight, and preferably in quantities of from about 0.5 percent to about 2 percent by weight, based on the total weight of foamable reaction mixture.

Polyisocyanates, and compounds contaiming at least two hydrogen atoms reactive with isocyanates, and additives of the kind described in large numbers in "-Vieweg-Hochtlen, Kunststoffhandbuch Band VII Polyurethane" are used in known manner for the preparation of the foamable reaction mixture.

According to the invention, it is possible to use polyisocyanates of any kind, preferably diisocyanates, such as, for example, tetramethylene diisocyanate, hexamethylene diisocyanate, N-xylylene diisocyanate, p-xylylene diisocyanate, 4,4'-dimethyl-1,3-xylylene diisocyanate, cyclohexane-1,4-diisocyanate, dicyclohexyl methane-4,4'-diisocyanate, N-phenylene diisocyanate, p-phenylene diisocyanate, 1-alkyl benzene-2,4 and 2,6-diisocyanate ditolylene-2,4 and 2,6-diisocyanate, 3-(a-isocyanatoethyl)-phenyl isocyanate, 1-benzyl-benzene-2,6-diisocyanate, 2,6-diethyl-benzene-1,4-diisocyanate, diphenyl-methane-4,4'-diisocyanate, 3,3'-dimethoxy-diphenyl-methane-4,4'-diisocyanate, naphthylene-1,5-diisocyanate and the like. It is also possible to use trifunctional or polyfunctional polyisocyanates, for example toluene-2,4-6-triisocyanate or polymethylene polyphenyl polyisocyanate obtained by phosgenation of the aniline-formaldehyde condensation product.

It is also possible to use isocyanates of the kind containing carbodiimide groups, uretdione groups, uretone imine groups, biuret groups or isocyanurate groups. Mixtures of the aforementioned isocyanates may also be used. It is also possible to use reaction products of polyhydric alcohols with polyisocyanates, and also polyisocyanates of the kind used, for example, in accordance with German Patent Specifications Nos. 1,022,789 and 1,027,394.

In the present context, compounds containing at least two hydrogen atoms reactive with isocyanates preferably include polyhydroxyl compounds or polyamines. These compounds preferably have molecular weights of from about 500 to about 10,000 and most preferably from about 800 to about 5,000.

Suitable active hydrogen-containing compounds include, for example, linear or branched polyesters or polyester amides which are obtained by known methods from mono- or polyfunctional alcohols and carboxylic acids or hydroxy carboxylic acids, optionally in the presence of amino alcohols, diamines, hydroxyamines or amino carboxylic acids, and which may also contain hetero atoms, double bonds and triple bonds and modifying radicals of unsaturated or saturated fatty acids or fatty alcohols. Other suitable compounds include linear polyalkylene glycol ethers of varying molecular weights obtained by polymerizing alkylene oxides, diethylene oxide, propylene oxide, styrene oxide, epichlorohydrin or tetrahydrofuran, and preferably those with a hydroxyl group content of from about 0.5 percent to about 18 percent. It is also possible to use copolymers. In this way, the properties of the end products are often remarkably modified. Linear or branched addition products obtained by addition of the aforementioned alkylene oxides with, for example, polyfunctional alcohols, amino alcohols or amines, are also suitable. The following are examples of polyfunctional starting components for the addition of the alkylene oxides: water, ethylene glycol, 1,2-propylene glycol, trimethylol propane, 1,2,4-butane triol, glycerol, pentaerythritol sorbitol and oligosaccharides and their aqueous solutions, polysaccharides, castor oil, ethanolamine, diethanolamine, triethanolamine, aniline, arylene diamines, alkylene diamines of the ethylene diamine, tetra of hexaethylene diamine type, and ammonia. It is of course also possible to use mixtures of linear and/or branched polyalkylene glycol ethers of different types. These polyalkylene glycol ethers may also be used in admixture with other hydroxyl compounds or amines, for example, in admixture with 1,4-butylene glycol, trimethylol propane, glycerol, 2,3-butylene glycol, pentaerythritol, tartaric acid esters, castor oil, or tall oil. Foaming of the polyalkylene glycol ethers may also be carried out in mixtures with polyesters. For example, it is possible to use OH-group-containing polycarbonates, polyacetals, polyamides, polyactones, or polyactams; Cl or OH-group-containing polytetrahydrofurans or polybutadiones. OH- and/or SH-group-containing polythioethers, phenols reacted with alkylene oxide, formaldehyde resins, hydrogenation products of ethylene-olefin-carbon monoxide copolymers and epoxy resins; amino-group-containing compounds, such as amino polyethers, polyesters or polyurethanes, and compounds containing carboxyl groups and/or cyclic anhydride groups, which in addition may contain ether, ester, amide, urea, urethane or thioether groups, are further examples of suitable compounds which react with isocyanates.

According to the invention, salts of aliphatic carboxylic acids and primary amines or primary, secondary or tertiary amines containing amide or ester groups, the salt containing a total of at least 25 aliphatic carbon atoms, are used as additives. Although it is preferred to use a stoichiometric mixture of acid and amine, deviations from the stoichiometric ratio of carboxyl groups to amino groups are also acceptable, although the excess of carboxyl or amino groups present, if any, should not exceed 50 mol percent.

Preferred additives include those which are liquid at room temperature and/or those which can be dissolved in one or more components of the foaming mixture.

Monocarboxylic acids or polycarboxylic acids, which may be saturated or unsaturated and optionally even substituted, may be used as the carboxylic acids, although it is preferred to use long-chain aliphatic monocarboxylic acids with more than 12 carbon atoms, which may be linear or branched, of which the following are some examples: stearic acid, commercial coconut fatty acid mixtures, tallow or train-oil fatty acids, commercial paraffin fatty acids which generally are also in the form of mixtures, undecylenic acid, oleic acid, linoleic acid, tall oil fatty acids, ricinoleic acid and the like. Oleic acid or tall oil fatty acids are preferred.

The primary amines used for salt formation may be linear, branched, cyclic and may be monoamines, diamines or polyamines containing 2 or more carbon atoms. It is preferred to use aliphatic monoamines with more than 12 carbon atoms, such as, for example, the following: stearylamine, oleylamine, amines of ketones of commercial mixtures of long-chain fatty acids, for example a 9-amino-heptadecane mixture, tallow amines and the like. So-called resin amines which can be obtained from resin acids, or abietylamine may also be used. The salts of 1 mol of oleic acid and 1 mol of oleyl amine, 0.5 mol of ethylene diamine or 1 mol of 9-aminoheptadecane are particularly preferred.

Some amine compounds suitable for use according to the process of the invention are for example, monoamines such as aminoethane, aminopropane, aminobutane, aminooctane, aminodecane, aminododecane, aminotetradecane, aminohexadecane, aminooctadecane, aminooctadecene, aniline, aminocyclohexane, p-nitroaniline, p-chloroaniline, p-ethoxyaniline, o-ethylaniline, m-aminobenzalacetophenone, 3,4-dichloroaniline, a-naphthylamine, N-ethylaminopropane, N-methylaminobutane, N-propylaminohexane, N-methylaniline, N-ethylaniline, di-N-butylamine, di-N-propylamine and the like; di- and polyamines such as ethylenediamine, propylenediamine, butylenediamine, pentamethylenediamine, p-phenylenediamine, m-phenylenediamine, 2,4-diaminotolylene, 2,5-diaminotoluene, 3,5-diaminotoluene, 2,6diaminotoluene, 1-methyl-3,5-diethyl-2,6-diaminobenzene, 1-methyl-3,5-diethyl-2,4-diaminobenzene, 1,3,5-triethyl-2,6-diaminobenzene, 3,3'-dimethyl-4,4'-diaminodiphenyl, 3,3'-dimethoxy-4,4'-diaminodiphenyl, 3,3'-diethoxy-4,4'-diaminodiphenyl, 4,4'-diaminodiphenylmethane, 4,4'-diaminodiphenyl dimethylmethane, 1,5-diaminonaphthylene, 3,3'-dichloro-4,4'-diaminodiphenylmethane, 4,4'-diaminodiphenylsulfone, 4,4'-methylene-bis(2-chloroaniline) and the like.

The amines containing amide or ester groups, may be primary, secondary or preferably tertiary. They can be readily obtained for example by reacting diamines such as ethylene diamine, propylene diamine, N-dimethylamino-propylamine or even polyamines with fatty acids under amide-forming conditions, in which case the quantity in which the fatty acid is used should be selected in such a way that the amide formed still has at least one free primary, secondary or preferably tertiary amino group. Although in principle any aliphatic carboxylic acid, whether monocarboxylic or polycarboxylic may be used as the fatty acid, it is preferred to use saturated or unsaturated monocarboxylic acids containing more than 12 carbon atoms, such as the types given hereinabove.

The amide-group-containing amine of N-dimethylaminopropylamine and oleic acid is particularly suitable, since it is easy to obtain on a large scale.

In principle, the same considerations apply to the amines containing ester groups, which are preferably tertiary. These can also be obtained in a known manner by reacting the addition products of alkylene oxides with primary or secondary amines, for example of alkanolamine such as triethanolamine, N-dimethylethanolamine, or N-dioleyl-ethanolamine, with the aforementioned fatty acids under esterification conditions. The amine of 3 mols of oleic acid and 1 mol of triethanolamine and 3-dimethylamino-1-propyl oleic acid are particularly preferred. The additives are best prepared by directly mixing the carboxylic acid with the amine, optionally in the melt or in solution. In a modification, the additives are prepared by mixing the components in one or more of the constituents of the foaming mixture.

In addition to fillers, dyes and other such additives, it is also possible to use flame-retarding additives, which may contain groups reactive with isocyanates, such as, for example, reaction products of phosphoric acid or phosphorous acid or phosphonic acids and alkylene oxides or alkylene glycols and the like. Reaction products of dialkyl phosphites, formaldehyde and dialkanolamines, and also flame-retarding agents which do not contain any groups reactive with isocyanates, for example tris-2-chlorethyl phosphate, tricresyl phosphate, and tris-dibromopropyl phosphate may also be employed.

Activators are employed in the usual way in the preparation of the foams, examples of which include dimethyl benzylamine, N-methyl-N-(N,N-dimethylaminoethyl)-piperazine, triethylene diamine, permethylated diethylene diamine, tetramethyl guanidine, tris-hydroxy methyl-hexahydrotriazine, and organo tin compounds, such as, for example, dibutyl tin dilaurate or stannous octoate. Stabilizers may also be used, examples of which include polyethers, polysiloxanes, sulphonated ricionoleic or oleic acid derivatives and their sodium salts. Water and/or low-boiling solvents, such as, for example, trichloro-monofluoromethane, dichloro-fluoromethane and methylene chloride, are used as expanding agents in quantities of at most about 2.2 mols, based on 100 parts by weight of the compound containing groups reactive with isocyanates and preferably in quantities of from about 0.02 to about 0.08 mol.

The products obtained by the process according to the invention may be used in the production of furniture, airframes, technical apparatus and components.

The invention is further illustrated by the following examples in which all parts and percentages are by weight unless otherwise specified.

EXAMPLES

A. Preparation of 9-aminoheptadecane oleate as the salt used in accordance with the invention.

About 30 parts (106 mols) of oleic acid are mixed with stirring and moderate cooling with about 25.5 parts (100 mols) of 9-aminoheptadecane (C 15 – C 19 mixture). The temperature rises to about 40°C. After about 1 hour, the temperature has fallen to room temperature, and the product is ready for use. Viscosity $\eta$ 25 = 77 cp.

EXAMPLE 1 a. About 100 parts of an activated and stabilized polyol mixture (OH number 450, viscosity $\eta$ 25 = 2300 cP) are stirred with about 8 parts of monofluoro-trichloro-methane, mixed in a two-component mixer (having a metering attachment) with about 133 parts of a polyisocyanate obtained by phosgenating the condensation product of aniline and formaldehyde (31.5% NCO, $\eta$ 25 = 320 cP) and introduced into a metal mold heated to about 60°C. The mold measures about 900 × about 200 × about 10 mm. The mold is coupled to a closure unit which enables the mold-release and mold-opening forces to be adjusted. The molding has the following physical properties determined in accordance with DIN specifications 53423 and 53424.

| | |
|---|---|
| Flexural strength: | $\delta_b B = 400 - 460$ kp/cm² |
| E modulus: | $E_b = 8000 - 9000$ kp/cm² |
| Tensile strength: | $\delta_z B = 160 - 200$ kp/cm² |
| Dimensional stability under heat: | $WB_{10} = 120°C$. | b. As in Example 1a, except that about 3 parts of the release agent prepared in A), supra, are added to the polyol mixture. The physical properties of the plastics molding are unaltered (cf. Table 1).

EXAMPLE 2 a. About 100 parts of an activated and stabilized polyol mixture (OH number 500, viscosity $\eta$ 25 = 950 cP) are stirred with about 8 parts of monofluoro-trichloro-methane, mixed in a two-component mixer (having a metering attachment) with about 140 parts of a 4,4'-diisocyanato-diphenylmethane derivative containing carbodiimide groups (31.5% NCO), prepared in accordance with German Patent Specification No. 1,092,007, and introduced into a mold heated to about 60°C. of the kind described in Example 1a. The molding has the following physical properties as determined in accordance with DIN Specification 53423 and 53424:

| | |
|---|---|
| Flexural srength: | $\delta_b B = 500 - 650$ kp/cm² |
| E modulus: | $E_b = 10,000 - 12,000$ kp/cm² |
| Tensile strength: | $\delta_z B = 190 - 230$ kp/cm² |
| Dimensional stability under heat: | $WB = 120°C$. | b. As in Example 2a except that about 3 parts of the release agent according to the invention prepared according to A) are added to the polyol mixture. The physical properties remain unaffected (cf. Table 1).

EXAMPLE 3 a. About 100 parts of an activated and stabilized polyol mixture (OH number 550, viscosity $\eta$ 25 = 1200 cP) are stirred with about 8 parts of monofluoro-trichloro-methane, mixed in a two-component mixer (having a metering attachment) with about 140 parts of polyisocyanate prepared by phosgenating the condensation product of aniline and formaldehyde (31.5% of NCO $\eta$ 25 = 320 cP) and introduced into a metal mold heated to about 60°C. of the kind described in Example 1a.

The physical properties of the plastics molding are determined in accordance with DIN Specifications 53423 and 53424:

| | |
|---|---|
| Flexural strength: | $\delta_b B = 550 - 600$ kp/cm² |
| E Modulus: | $E_b = 11,00 - 13,000$ kp/cm² |
| Tensile strength: | $\delta_z B = 220 - 280$ kp/cm² |
| Dimensional stability under heat: | $WB_{10} = 85 - 85°C$. | b. As in Example 3a except that about 3 parts of the release agent according to the invention prepared according to A) are added to the polyol mixture. The physical properties remain unaffected (cf. Table 1).

Although the invention has been described in considerable detail in the foregoing it is to be understood that such detail is solely for purposes of illustration and that many variations may be made by those skilled in the art without departing from the spirit and scope of the invention.

What is claimed is

1. In a process for the production of molded articles of integral skin polyurethane foam by foaming a reaction mixture, in a closed mold, said reaction mixture comprising an organic polyisocyanate, an organic compound containing at least two hydrogen atoms reactive with isocyanates, and a blowing agent, the improvement which comprises adding to the reaction mixture from about 0.1 percent to about 15 percent by weight, based on the total weight of reaction mixture, of a mold release agent containing at least 25 aliphatic carbon atoms selected from the group consisting of a salt of an aliphatic carboxylic acid with a primary amine; a salt of an aliphatic carboxylic acid with an amine containing amide groups, said amine containing amide groups being the reaction product of an aliphatic carboxylic

TABLE 1

| Example | Release agent Incorporated | Release agent External | Mold release time (mins.) | Number of mold releases | Specific mold opening force (kp./cm.²) First mold | Specific mold opening force (kp./cm.²) Last release | Assessment | Lacquering [a] properties |
|---|---|---|---|---|---|---|---|---|
| 1a | | I | 5 | 5 | 0.8 | 1.5 | A troublesome layer is formed on the surface of the mold | — |
| 1a | | | 5 | 1 | <8.0 | | Molding destroyed | — |
| 1b | II | | 5 | 50 | 0.8 | 0.8 | No signs of any troublesome layers being formed on the surface of the mold. | + |
| 1b | III | | 5 | 50 | 0.8 | 0.8 | ...do | + |
| 1b | IV | | 5 | 50 | 0.8 | 0.8 | ...do | + |
| 1b | V | | 5 | 50 | 0.8 | 0.8 | ...do | + |
| 1b | VI | | 5 | 50 | 1.0 | 1.0 | ...do | + |
| 1b | VII | | 5 | 50 | 0.8 | 0.8 | ...do | + |
| 1b | VIII | | 5 | 50 | 0.8 | 0.8 | ...do | + |
| 1b | IX | | 5 | 50 | 0.8 | 0.8 | ...do | + |
| 2a | | I | 5 | 4 | 0.8 | 3.5 | Troublesome layer formed on the surface of the mold | — |
| 2a | | X | 10 | 1 | 4.0 | | ...do | — |
| 2a | | | 5 | 1 | <8.0 | | Molding destroyed | — |
| 2b | II | | 5 | 50 | 1.2 | 1.2 | No troublesome layers formed on the surface of the mold | + |
| 2b | VII | | 5 | 50 | 1.1 | 1.1 | ...do | + |
| 2b | IX | | 5 | 50 | 1.0 | 1.0 | ...do | + |
| 3a | | I | 5 | 2 | 2.0 | 3.0 | A troublesome layer is formed on the surface of the mold | |
| 3a | | X | 10 | 1 | 5.0 | | ...do | |
| 3a | | | 5 | 20 | 3.5 | 7.0 | High opening force. No layers formed on the surface of the mold | + |
| 3b | II | | 5 | 50 | 0.8 | 1.0 | No signs of any troublesome layers being formed on the surface of the mold. | + |
| 3b | VII | | 5 | 50 | 0.8 | 0.9 | ...do | + |
| 3b | VIII | | 5 | 50 | 0.9 | 0.9 | ...do | + |
| 3b | IX | | 5 | 50 | 0.8 | 0.8 | ...do | + |

[a] +=lacquer adhesion without pre-treatment good; —=lacquer adhesion without pre-treatment poor. Lacquer systems tested: DD lacquers, polyester lacquers with polyisocyanates, acrylic resin lacquers, acid-catalyzed lacquers.

NOTE:
I=aluminium stearate; II=9-aminoheptadecane oleate; III=oleyl amine oleate; IV=methyl-bis (3-oleic acid amidopropyl)-amino oleate; V=amino oleate (amine obtained from resinic acids); VI=tris-ethyloleate amino oleate; VII=oleic acid-N,N-diethylamino ethylester oleate; VIII=oleic acid-(N,N-methyl phenylamino)-ethylester-2-oleate; IX=oleic acid-3-dimethylamino propylamide-1-oleate; X=soap solution (30%).

acid and a di- or polyamine such that the amide contains at least one free primary, secondary or tertiary amino group; and a salt of an aliphatic carboxylic acid with an amine containing ester groups, said amine containing ester groups being the reaction product of an aliphatic carboxylic acid, an alkylene oxide and a primary or secondary amine.

2. The process of claim 1 wherein the aliphatic carboxylic acid contains at least 12 aliphatic carbon atoms.

3. The process of claim 1 wherein the primary amine or the amine which contains amide or ester groups contains at least 12 aliphatic carbon atoms.

4. The process of claim 1 wherein the aliphatic carboxylic acid is oleic acid.

5. The process of claim 1 wherein the amine is 9-aminoheptadecane.

6. The process of claim 1 wherein the compound containing at least 25 aliphatic carbon atoms is 9-amino-heptadecane oleate.

7. The process of claim 1 wherein the amide group containing amine is the reaction product of N-dimethylamino propylamine and oleic acid.

* * * * *